(12) United States Patent
Codandam et al.

(10) Patent No.: US 11,329,845 B2
(45) Date of Patent: May 10, 2022

(54) PORT MIRRORING OVER EVPN VXLAN

(71) Applicant: Juniper Networks, Inc., Sunnyvale, CA (US)

(72) Inventors: Sudarsanan Codandam, Herndon, VA (US); Velumani Chennakesavan, Fremont, CA (US); Prabakaran Arumugam, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 123 days.

(21) Appl. No.: 16/835,113

(22) Filed: Mar. 30, 2020

(65) Prior Publication Data

US 2021/0119827 A1    Apr. 22, 2021

Related U.S. Application Data

(60) Provisional application No. 62/916,867, filed on Oct. 18, 2019.

(51) Int. Cl.
*H04L 12/46*  (2006.01)
*H04L 12/931*  (2013.01)
*H04L 49/20*  (2022.01)

(52) U.S. Cl.
CPC ........ *H04L 12/4641* (2013.01); *H04L 49/208* (2013.01)

(58) Field of Classification Search
CPC .......................... H04L 12/4641; H04L 49/208
See application file for complete search history.

(56) References Cited

U.S. PATENT DOCUMENTS

2014/0075041 A1*  3/2014  Keesara .................. H04L 49/20
                                                                   709/231
2014/0122704 A1*  5/2014  Wang .................... H04L 49/354
                                                                   709/224

(Continued)

FOREIGN PATENT DOCUMENTS

CN        108574616 A     9/2018
WO     2013184846 A1    12/2013

OTHER PUBLICATIONS

Sajassi et al., "BGP MPLS-Based Ethernet VPN," RFC 7432, Internet Engineering Task Force (IETF), Feb. 2015, 56 pp.

(Continued)

*Primary Examiner* — Luat Phung
(74) *Attorney, Agent, or Firm* — Shumaker & Sieffert, P.A.

(57) ABSTRACT

This disclosure describes techniques for improved port mirroring over Ethernet Virtual Private Network (EVPN) Virtual eXtensible Local Area Network (VXLAN). For example, a method includes receiving, by a first network device of a plurality of network devices of a leaf and spine network configured with an Ethernet Virtual Private Network and from a second network device of the plurality of network devices, an extended routing message including information indicating the second network device is connected to an analyzer, and wherein the plurality of network devices is configured with a Virtual Local Area Network (VLAN) for which the analyzer is configured to analyze packets. The method also includes configuring, within forwarding information of the first network device and in response to receiving the extended routing message advertised by the second network device, a next hop that specifies packets associated with the VLAN are to be forwarded to the second network device.

20 Claims, 5 Drawing Sheets

(56) References Cited

U.S. PATENT DOCUMENTS

2018/0013654 A1    1/2018  Kapadia et al.
2019/0068476 A1*   2/2019  Ranjit .................... H04L 43/06
2020/0021523 A1*   1/2020  Wang ................. H04L 12/4641

OTHER PUBLICATIONS

Extended Search Report from counterpart European Application No. 20180136.2, dated Nov. 12, 2020, 10 pp.

Rabadan et al., "Usage and Applicability of BGP MPLS-Based Ethernet VPN," Internet Engineering Task Force (IETF), May 2018, 31 pp.

Response to the Extended Search Report dated Nov. 12, 2020, filed Oct. 21, 2021, from counterpart European Application No. 20180136.2, 51 pp.

* cited by examiner

PORT MIRRORING OVER EVPN VXLAN

This application claims the benefit of U.S. Provisional Patent Application No. 62/916,867 filed on Oct. 18, 2019, which is hereby incorporated by reference herein in its entirety.

TECHNICAL FIELD

This disclosure relates to computer networks.

BACKGROUND

A data center is a collection of interconnected computer servers and associated components, housed in one or more facilities. In a typical data center, a large collection of interconnected servers provides computing and/or storage capacity for execution of various applications. For example, a data center may comprise a facility that hosts applications and services for subscribers, i.e., customers of data center. The data center may, for example, host all of the infrastructure equipment, such as networking and storage systems, redundant power supplies, and environmental controls. In most data centers, clusters of storage systems and application servers are interconnected via a high-speed switch fabric provided by one or more tiers of physical network switches and routers. More sophisticated data centers provide infrastructure spread throughout the world with subscriber support equipment located in various physical hosting facilities.

Data centers are often made up of a large number of devices, including both servers and devices that form an Internet Protocol (IP) fabric. The IP fabric may be represented as an underlay network having leaf and spine devices. Devices may send traffic to an analyzer to monitor network traffic, enforce network usage policies, enforce file sharing policies, identify causes of problems, identify stations or applications with heavy or abnormal bandwidth usage, or the like.

SUMMARY

In general, this disclosure describes techniques for a network device configured to improve (e.g., optimize) port mirroring over Ethernet Virtual Private Network (EVPN) Virtual eXtensible Local Area Network (VXLAN). Examples are described in which, leaf devices in an IP fabric having leaf and spine devices may send packets directly to a device connected to an analyzer that is configured to monitor and analyze packets associated with a Virtual Local Area Network (VLAN), rather than flooding packets to each device of the VLAN.

In one example implementation, the device connected to the analyzer is configured as a "mirror root" device to advertise an extended routing message, e.g., an Inclusive Multicast Ethernet Tag (IMET) (Type 3) EVPN route, including information indicating the device is connected to the analyzer. For example, the IMET route may include Network Layer Reachability Information (NLRI) with an extended community specifying information (referred to herein as "mirror root information") to indicate the originator of the IMET route with the extended community is a mirror root device. The other devices (e.g., devices not connected to the analyzer) are configured as "mirror leaf" devices and in response to receiving an extended routing message, configure a next hop that specifies the mirror root device that advertised the extended routing message. In this way, when a mirror leaf device receives a packet to be analyzed by the analyzer, the mirror leaf device mirrors (i.e., copies) the packet on a receiving port and sends the mirrored packet to the VLAN to only the mirror root device as specified in the next hop rather than flooding the mirrored packet on all ports to all devices in the VLAN. For example, the mirror leaf device may tunnel the mirrored packet to the mirror root device (e.g., as a VXLAN tunneling endpoint (VTEP) for the VLAN.

In some examples, an additional analyzer is connected to another device of the VLAN (e.g., spine or leaf device) and is also configured as a mirror root device for the VLAN. In these examples, a second device of the IP fabric is connected to a second analyzer and is configured as a second mirror root device that advertises a second extended routing message, e.g., IMET route including information indicating the second device is connected to the second analyzer (e.g., extended community with mirror root information). When mirror leaf devices in the VLAN receive the second extended routing message including information indicating the second device is connected to the second analyzer, the mirror leaf devices configure an additional next hop in the flood list for the VLAN, where the additional next hop specifies the second device that advertised the second extended routing message. In this way, when a mirror leaf device receives a packet to be analyzed by an analyzer (e.g., either the first analyzer or the second analyzer), the mirror leaf device mirrors (i.e., copies) the packet on a receiving port and sends the mirrored packet to the VLAN, which specifies the next hops to the mirror root devices.

The techniques described in this disclosure may provide one or more technical advantages that realizes a practical application. For example, by configuring devices as a mirror root device and mirror leaf devices to perform port mirroring of packets to the mirror root device, packets are forwarded on a point-to-point connection to the mirror root device rather than flooded to all devices in the VLAN, thereby using less ports for port mirroring, which reduces traffic congestion and bandwidth consumption.

In one example of the techniques described herein, a method includes receiving, by a first network device of a plurality of network devices of a leaf and spine network configured with an Ethernet Virtual Private Network and from a second network device of the plurality of network devices, an extended routing message including information indicating the second network device is connected to an analyzer, and wherein the plurality of network devices is configured with a Virtual Local Area Network (VLAN) for which the analyzer is configured to analyze packets. The method also includes configuring, within a forwarding information of the first network device and in response to receiving the extended routing message advertised by the second network device, a next hop that specifies packets associated with the VLAN are to be forwarded to the second network device.

In another example, a method includes generating, by a first network device of a plurality of network devices of a leaf and spine network configured with an Ethernet Virtual Private Network, an extended routing message including information indicating the first network device is connected to an analyzer, wherein the plurality of network devices is configured with a Virtual Local Area Network (VLAN) for which the analyzer is configured to analyze packets. The method also includes sending, by the first network device, the extended routing message to the plurality of network devices configured with the VLAN to cause the plurality of network devices to configure a next hop that specifies packets associated with the VLAN are to be forwarded to the first network device.

In another example, a first network device includes a plurality of ports, wherein each port is configured to be communicatively coupled to a respective network device of a plurality of network devices of a leaf and spine network configured with an Ethernet Virtual Private Network. The first network device also includes one or more processors operably coupled to a memory, wherein the one or more processors are configured to: receive, from a second network device of the plurality of network devices, an extended routing message including information indicating the second network device is connected to an analyzer, and wherein the plurality of network devices is configured with a Virtual Local Area Network (VLAN) for which the analyzer is to analyze packets; and configure, within forwarding information of the first network device and in response to receiving the extended routing message advertised by the second network device, a next hop for the VLAN that specifies packets associated with the VLAN are to be forwarded to the second network device.

The details of one or more examples are set forth in the accompanying drawings and the description below. Other features, objects, and advantages will be apparent from the description and drawings, and from the claims.

DETAILED DESCRIPTION

Figure 1:
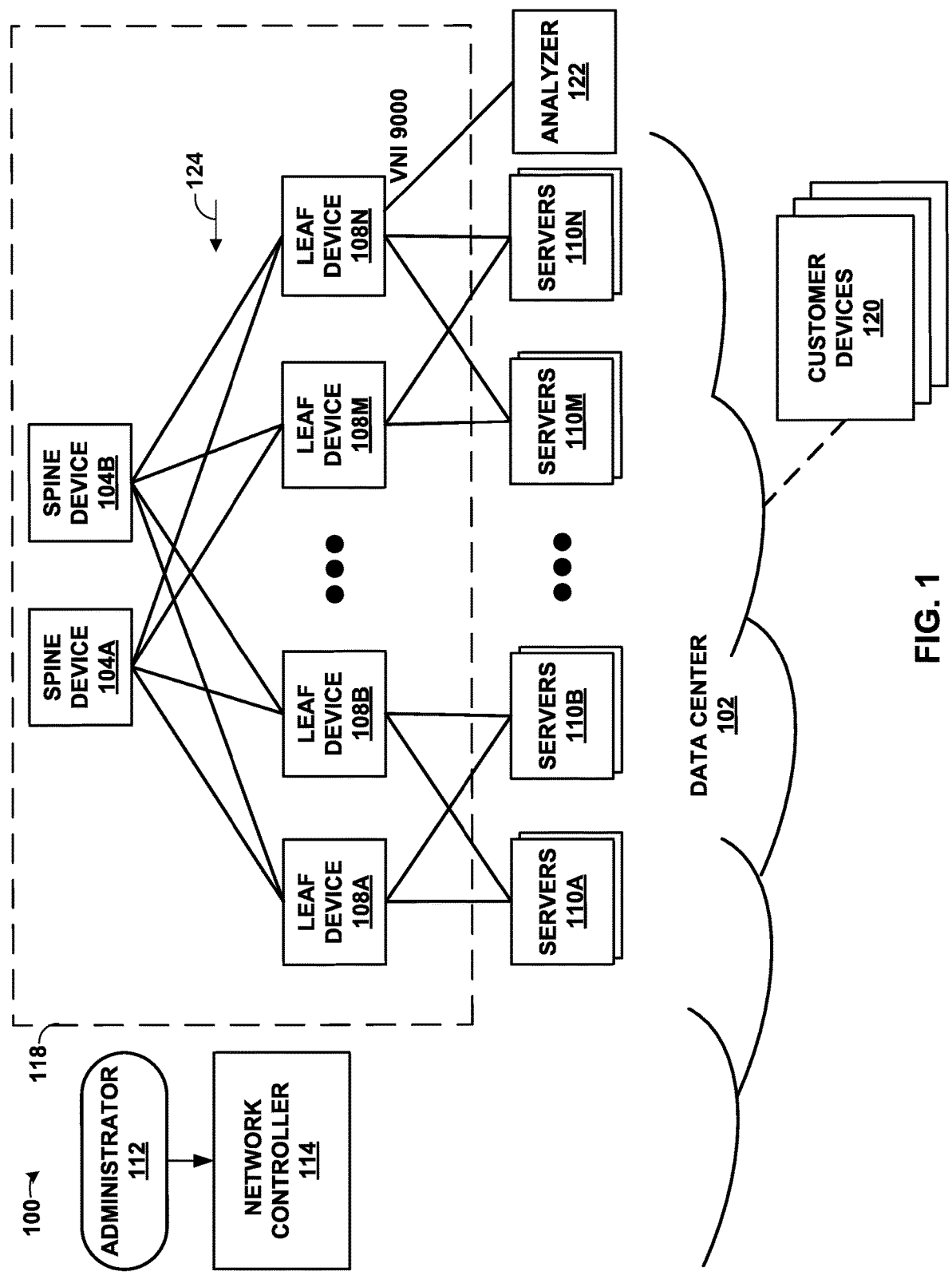
FIG. 1 is a block diagram illustrating an example network configured to provide improved port mirroring over EVPN VXLAN, in accordance with techniques described in this disclosure.

FIG. 1 is a block diagram illustrating an example network configured to provide improved (e.g., optimized) port mirroring over EVPN VXLAN, in accordance with techniques described in this disclosure. FIG. 1 illustrates an example network 100 including a data center 102 connected to customer devices 120. Data center 102 may, for example, host infrastructure equipment, such as networking and storage systems, redundant power supplies, and environmental controls. In general, data center 102 provides an operating environment for applications and services for customer devices 120 coupled to the data center, e.g., by a service provider network (not shown). In some examples, a service provider network that couples customer devices 120 to data center 102 may be coupled to one or more networks administered by other providers, and may thus form part of a large-scale public network infrastructure, e.g., the Internet.

In some examples, data center 102 represents one of many geographically distributed network data centers. As illustrated in the example of FIG. 1, data center 102 may be a facility that provides network services for customers through customer devices 120. Customer devices 120 may include the devices of entities (such as enterprises and governments) and of individuals. For example, a network data center may host web services for both enterprises and end users. Other example services may include data storage, virtual private networks, traffic engineering, file service, data mining, scientific- or super-computing, and so on. In some examples, data center 102 may be individual network servers, network peers, or otherwise. In some examples, data center 102 is an enterprise or internal data center.

Data center 102 may include one or more interconnected servers, e.g., servers 110A-110N (collectively, "servers 110") that each provides execution and storage environments for applications and data associated with customers via customer devices 120 and may be physical servers, virtual machines, or combinations thereof. Servers 110 are interconnected via an Internet Protocol (IP) fabric 118, which may comprise a fabric provided by one or more tiers of physical network devices, such as, for example, routers, gateways, switches, hubs, modems, bridges, repeaters, multiplexers, servers, virtual machines running on one or more of the same, and other example network devices.

In the example of FIG. 1, network controller 114 provides a high-level controller for configuring and managing routing and switching infrastructure of data center 102. Network controller 114 may represent, for example, a software defined network (SDN) controller that communicates and manages the devices of data center 102 using an SDN protocol, such as the Path Computation Element (PCE) Communication Protocol (PCEP). In some examples, network controller 114 may communicate and manage the devices of data center 102 using eXtensible Messaging and Presence Protocol (XMPP), PCEP or Border Gateway Protocol messages. Additionally, or alternatively, network controller 114 may communicate with the routing and switching infrastructure of data center 102 using other interface types, such as a Simple Network Management Protocol (SNMP) interface, path computation element protocol (PCEP) interface, a Device Management Interface (DMI), a CLI, Interface to the Routing System (IRS), or any other device configuration interface.

Network controller 114 provides a logically—and in some cases, physically—centralized controller for facilitating operation of one or more networks within data center 102 in accordance with examples of this disclosure. In some examples, network controller 114 may operate in response to configuration input received from network administrator 112. Additional information regarding network controller 114 operating in conjunction with other devices of data center 102 can be found in International Application Number PCT/US2013/044378, filed Jun. 5, 2013, and entitled PHYSICAL PATH DETERMINATION FOR VIRTUAL NETWORK PACKET FLOWS, which is hereby incorporated by reference.

In general, network traffic within IP fabric 118, such as packet flows between servers 110, may traverse the physical network of IP fabric 118 using many different physical paths. For example, a "packet flow" can be defined by values used in a header of a packet, such as the network "five-tuple," i.e., a source IP address, destination IP address, source port and destination port that are used to route packets through the physical network, and a communication protocol. For example, the protocol specifies the communications protocol, such as TCP or UDP, and Source port and Destination port refer to source and destination ports of the connection. A set of one or more packet data units (PDUs) that match a particular flow entry represent a flow. Flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port.

IP fabric 118 may provide servers 110 with redundant (multi-homed) connectivity to the IP fabric and service provider network. In this example, IP fabric 118 represents layer two (L2) and layer three (L3) switching and routing components that provide point-to-point connectivity between servers 110. In one example, IP fabric 118 comprises a set of interconnected, packet-based routers and switches that implement various protocols. In one example, IP fabric 118 may comprise devices that provide IP point-to-point connectivity. In some multi-staged networks such as IP fabric 118, each switch resides in a defined layer of the network, referred to as a CLOS topology or a spine and leaf network. As shown in the example of FIG. 1, spine devices 104A and 104B (collectively, "spine devices 104") reside in a first, top layer and leaf devices 108A-108N (collectively, "leaf devices 108") reside in a second layer. Leaf devices 108 may be network devices that provide layer 2 (e.g., MAC) and/or layer 3 (e.g., IP) routing and/or switching functionality. Spine devices 104 aggregate traffic flows and provides high-speed connectivity between leaf devices 104. Spine devices 104 are coupled to IP fabric 118 may operate as a layer 3 gateway device. Spine devices 104 and leaf devices 108 may each include one or more processors and a memory, and that are capable of executing one or more software processes. As shown in the example of FIG. 1, each of spine devices 104 is communicatively coupled to each of leaf devices 108A-108N. The configuration of network 100 illustrated in FIG. 1 is merely an example. For example, data center 102 may include any number of spine and leaf devices.

Spine devices 104 and leaf devices 108 may each participate in an L2 virtual private network ("L2VPN") service, such as an Ethernet Virtual Private Network (EVPN). An EVPN is a service that provides a form of L2 connectivity across an intermediate L3 network, such as a service provider network, to interconnect two or more L2 networks that may be located in different racks of data center 102. Often, EVPN is transparent to the customer networks in that these customer networks are not aware of the intervening intermediate network and instead act and operate as if these customer networks were directly connected and form a single L2 network. In a way, EVPN enables a form of transparent local area network ("LAN") connection between two customer networks (e.g., different racks of data center 102) that each operates an L2 network and may also be referred to as a "transparent LAN service."

To provide flexibility and scalability, multiple bridge domains can be defined for a particular EVPN instance (EVI). One or more EVIs can be associated with a single L3 VPN virtual routing and forwarding instance (VRF). For example, each data center tenant may be assigned a unique VRF; a tenant can encompass one or more EVPN instances and one or more bridge domains (e.g., VLANs or VXLANs) per EVPN instance. Spine devices 104 and leaf devices 108 may be included in one or more virtual LANs (VLANs), which are groups of devices on one or more LANs that are configured to communicate as if they are attached to the same wire.

In the example of FIG. 1, leaf device 108N is connected to analyzer 122 to monitor and analyze traffic. For example, analyzer 122 may monitor network traffic, enforce network usage policies, enforce file sharing policies, identify causes of problems, identify stations or applications with heavy or abnormal bandwidth usage, or the like. In the example of FIG. 1, spine devices 104 and leaf devices 108 are configured in a VXLAN VLAN to send traffic to the analyzer (referred to herein as "analyzer VLAN").

Typically, to enable delivery of traffic to devices in the analyzer VLAN, the devices may each advertise an Inclusive Multicast Ethernet Tag (IMET) (Type 3) route to discover which devices belong to the same analyzer VLAN. For example, each device of an analyzer VLAN use Border Gateway Protocol (BGP) to advertise an IMET route that includes Network Layer Reachability information (NLRI) comprising a Route Distinguisher, Ethernet Tag Identifier, network address length, and the identifier of the originating network device.

Ordinarily, network devices may be configured with port mirroring to send copies of a packet to either a local interface connected to an analyzer for local monitoring or to the analyzer VLAN for remote monitoring by an analyzer connected to a remote device (e.g., leaf or spine device). Devices configured with analyzer VLAN are typically unaware of which device is connected to the analyzer and treat the mirrored packets to analyzer VLAN (e.g., to each of the devices that advertised an IMET route) as broadcast traffic. For example, when a leaf device receives a packet from a server, the leaf device mirrors the packet and sends the mirrored packets to all devices that advertised an IMET route for the analyzer VLAN. However, flooding traffic to the analyzer VLAN results in traffic congestion and consumes bandwidth (e.g., EVPN VXLAN fabric bandwidth).

In accordance with techniques of this disclosure, devices of IP fabric 118 may provide improved port mirroring over Ethernet Virtual Private Network (EVPN) Virtual eXtensible Local Area Network (VXLAN) to mirror packets only to a device connected to an analyzer rather than flooding the packet to all the devices in the analyzer VLAN.

In the example of FIG. 1, leaf devices 108A-108M and spine devices 104A-104B are not connected to an analyzer, and are configured as "mirror leaf" devices for the analyzer VLAN. For example, a user or administrator, e.g., administrator 112, may configure (e.g., using a Command Line Interface (CLI)) leaf devices 108A-108M and spine devices 104A-104B as mirror leaf devices for the analyzer VLAN. As one example, the leaf devices 108A-108M and spine devices 104A-104B are configured with a description for the analyzer VLAN (e.g., "Remote Analyzer VLAN"), a VLAN identifier (ID) (e.g., 900), and are further configured as "mirror leaf" devices for the analyzer VLAN to cause the mirror leaf devices to configure a next hop that specifies a device (e.g., leaf device 108N) that advertises an extended routing message, e.g., Inclusive Multicast Ethernet Tag (IMET) (Type 3) EVPN route including information (referred to herein as "mirror root information") to indicate that leaf device 108N is configured as a mirror root device connected to analyzer 122 (as further described below). The configuration may include a virtual network identifier ("VNI") (e.g., VNI 9000 in the example below), such as a VXLAN tag, that identifies a corresponding VXLAN instance to tunnel a mirrored packet over the EVPN to the mirror root device, e.g., leaf device 108N. An example of the configuration of leaf devices 108A-108M and spine devices 104A-104B for the analyzer VLAN is shown below:

```
set vlans ANALYZER description "Remote Analyzer VLAN"
set vlans ANALYZER vlan-id 900
set vlans ANALYZER vni 9000 mirror leaf
```

In the example of FIG. 1, leaf device 108N is connected to analyzer 122, and is configured as a "mirror root" device for the analyzer VLAN. Although this example describes a leaf device configured as a mirror root device, any of the devices in the leaf and spine network that is connected to an analyzer may be configured as a mirror root device. Administrator 112 may configure (e.g., using the CLI) leaf device 108N with a description for the analyzer VLAN (e.g., "Remote Analyzer VLAN"), a VLAN identifier (ID) (e.g., 900), and is further configured as a "mirror root" device for the analyzer VLAN to cause leaf device 108N to advertise an extended routing message, e.g., IMET route, including information that indicates leaf device 108N is configured as a mirror root device connected to analyzer 122 (as further described below). The configuration may include the VNI (e.g., VNI 9000 in the example below), such as a VXLAN tag, that identifies a corresponding VXLAN instance to tunnel a mirrored packet over the EVPN to the mirror root device, e.g., leaf device 108N. An example of the configuration of leaf device 108N for the analyzer VLAN is shown below:

```
set vlans ANALYZER description "Remote Analyzer VLAN"
set vlans ANALYZER vlan-id 900
set vlans ANALYZER vni 9000 mirror root
```

To cause mirror leaf devices to mirror traffic only to a mirror root device (e.g., leaf device 108N), leaf devices and spine devices may advertise an extended routing message to indicate whether the advertising device is configured as a mirror root device or a mirror leaf device. For example, leaf device 108N may advertise an extended routing message 124 including information (referred to herein as "mirror root information") that indicates leaf device 108N is configured as a mirror root device connected to analyzer 122. Leaf device 108N may use, as one example, BGP to advertise an IMET route including an extended community that specifies information (e.g., a flag set to "1") to indicate leaf device 108N is configured as a mirror root device. That is, the mirror root device may advertise an IMET route including an extended community that specifies mirror root information to cause other devices of the analyzer VLAN to discover which device is connected to the analyzer and to mirror traffic only to the device connected to analyzer 122. Similarly, each of the devices configured as mirror leaf devices may advertise an IMET route including an extended community that specifies information (e.g., a flag set to "0") to indicate the device is configured as a mirror leaf device that is not connected to an analyzer. Additional examples of IMET routes and its extended communities are described in A. Sajassi, Ed., et al., "BGP MPLS-Based Ethernet VPN," Internet Engineering Task Force (IETF), Request for Comments (RFC) 7432, February 2015, the entire contents of which is incorporated by reference herein.

The leaf and spine devices configured as mirror leaf devices may configure a next hop for the VLAN that specifies the mirror root device. For example, instead of adding all devices that originated an IMET route without the extended community, the mirror leaf devices may configure the next hop with only the devices that advertise an IMET route with an extended community including information that indicates the devices that are configured as mirror root devices. In the example of FIG. 1, leaf devices 108A-108M and spine devices 104A-104B, that are each configured as a mirror leaf device configures the next hop for the analyzer VLAN with only leaf device 108N that advertised extended routing message 124.

When mirror leaf devices receive from servers 110 a packet to be analyzed by analyzer 122, the mirror leaf devices may mirror the packet on the receiving port and send the mirrored packet to the analyzer VLAN (e.g., VLAN 900). Because the next hop specifies only the mirror root device, the mirror leaf devices send the mirrored packet to only the mirror root device. As one example, leaf device 108A may receive a packet from server 110A, mirror the packet for the analyzer VLAN, perform a lookup of its forwarding information to determine a next hop to the mirror root device, and tunnels the traffic to the mirror root device using an IP tunneling scheme, such as VXLAN.

VXLANs provide a tunneling scheme to overlay L2 networks on top of L3 networks. VXLANs establish tunnels for communicating traffic, e.g., BUM packets, over common physical IP infrastructure (e.g., IP fabric 118). Devices that support VXLANs are called virtual tunnel endpoints (VTEPs) (also known as "VXLAN tunnel endpoints"). In this example, data center 118 includes an underlay network that transports L2 communications through a VXLAN. Spine devices 104 and leaf devices 108 may be VTEPs that are configured to encapsulate and/or decapsulate VXLAN traffic. As one example, leaf device 108A may receive a packet from server 110A, mirrors the packet for the analyzer VLAN, and tunnels the packet through IP fabric 118 by encapsulating an "outer packet" with a VNI (e.g., VNI 9000 in this example), such as a VXLAN tag, that identifies a corresponding VXLAN instance to tunnel the payload or "inner packet" over the EVPN to the mirror root device, e.g., leaf device 108N. When leaf device 108N receives the packet from the EVPN, leaf device 108N decapsulates the outer packet and forwards the L2 communications via the VXLAN for transport to analyzer 122. In this way, by configuring devices as a mirror root device and mirror leaf devices to perform port mirroring of packets to the mirror root device, packets are forwarded on a point-to-point connection to the mirror root device rather than flooded to all devices in the VLAN, thereby using less ports for port mirroring, which reduces traffic congestion and bandwidth consumption.

Figure 2:
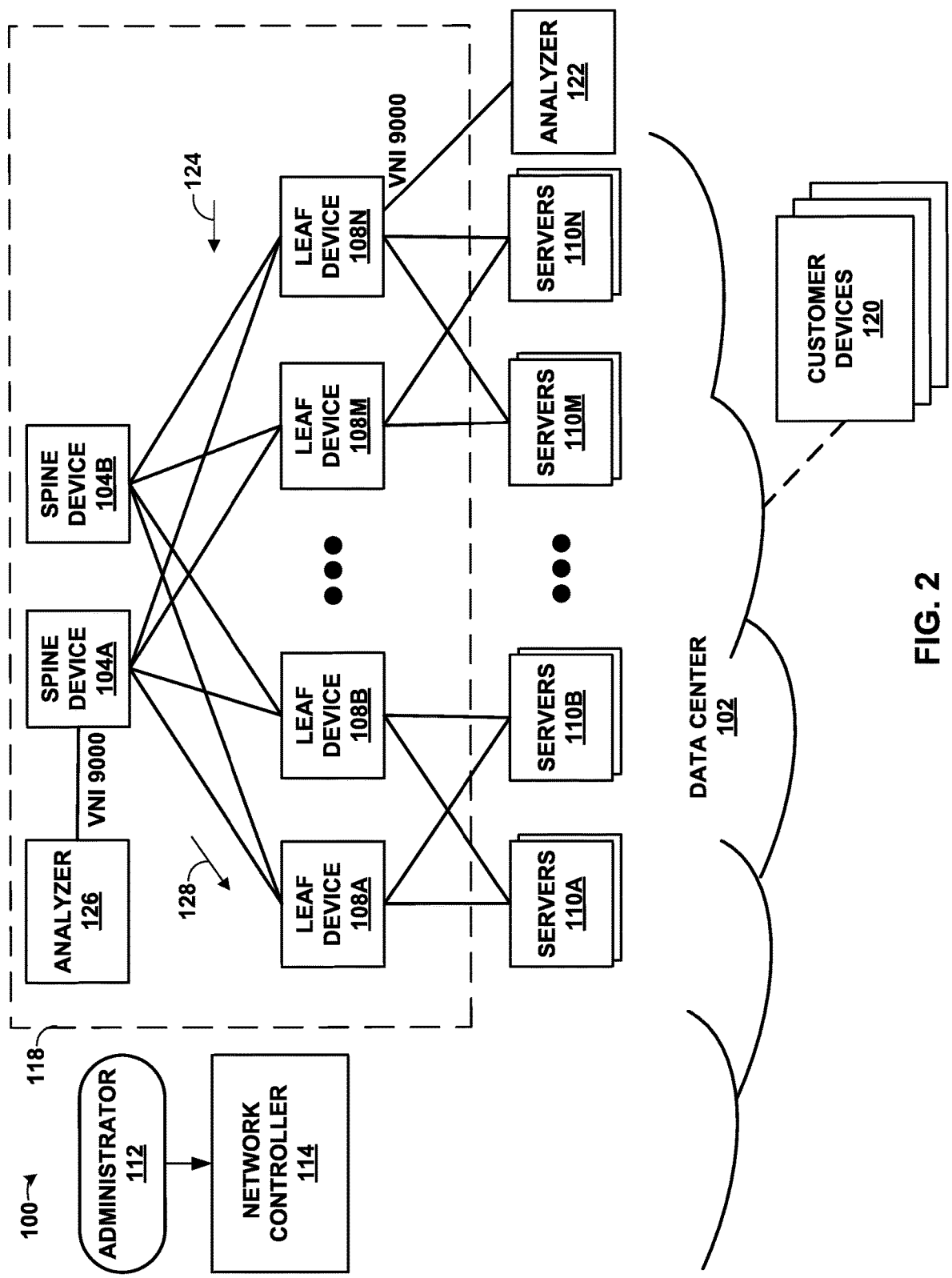
FIG. 2 is a block diagram illustrating another example implementation of the network of FIG. 1 configured to provide improved port mirroring over EVPN VXLAN when one or more additional analyzers are connected to devices, in accordance with techniques described in this disclosure.

FIG. 2 is a block diagram illustrating another example implementation of network 100 configured to provide improved port mirroring over EVPN VXLAN when one or more additional analyzers are connected to devices, in accordance with techniques described in this disclosure. In the example of FIG. 2, another analyzer, e.g., analyzer 126, is added to network 100 and is connected to spine device 104A.

Similar to the example described with respect to FIG. 1, administrator 112 may configure (e.g., using a Command Line Interface (CLI)) spine device 104A as a mirror root device of the analyzer VLAN. For example, spine device 104A is configured with a description for the analyzer VLAN (e.g., "Remote Analyzer VLAN"), a VLAN identifier (ID) (e.g., VNI 9000), and is further configured as a mirror root device for the analyzer VLAN to cause spine device 104A to advertise an extended routing message, e.g., IMET route, including information that indicates spine device 104A is connected to analyzer 126 (as further described below). The configuration may include a VNI (e.g., VNI 9000 in the example below), such as a VXLAN tag, that identifies a corresponding VXLAN instance to tunnel a mirrored packet over the EVPN to the mirror root device, e.g., leaf device 108N. An example of the configuration of spine device 104A is shown below:

```
set vlans ANALYZER description "Remote Analyzer VLAN"
set vlans ANALYZER vlan-id 900
set vlans ANALYZER vni 9000 mirror root
```

To cause mirror leaf devices (e.g., leaf devices 108A-108M and spine device 104B) to also mirror traffic to spine device 104A that is connected to analyzer 126, spine device 104A may also advertise an extended routing message 128 including information that indicates spine device 104A is connected to analyzer 126. For example, spine device 104A uses BGP to advertise an IMET route including an extended community that specifies mirror root information (e.g., a flag set to "1") to indicate spine device 104A is configured as a mirror root device.

In this example, each of the mirror root devices, e.g., leaf device 108N and spine device 104A, may advertise extended routing messages 124 and 128, respectively, each including an extended community that specifies mirror root information (e.g., a flag set to "1") for a corresponding mirror root device to indicate leaf device 108N and spine device 104A are configured as mirror root devices of the analyzer VLAN.

The leaf and spine devices configured as mirror leaf devices may receive two IMET routes with the extended community (e.g., IMET routes 124 and 128) and add only leaf device 108N and spine device 104A as part of the flood list next hops instead of adding all devices that originated the IMET route without the extended community. For example, leaf devices 108A-108M and spine device 104B, each configured as a mirror leaf device, configures the flood list for the analyzer VLAN with a next hop to the devices from which the mirror leaf device received an IMET route with the extended community for VNI 9000 (e.g., leaf device 108N and a next hop to spine device 104A). In this way, when mirror leaf devices receive traffic from servers 110, the mirror leaf devices may send mirrored packets for the analyzer VLAN (e.g., VLAN 900) to leaf device 108N connected to analyzer 124 (e.g., by encapsulating the mirrored packet with an outer packet with VNI 9000) and to spine device 104A connected to analyzer 128 (e.g., by encapsulating the mirrored packet with an outer packet with VNI 9000).

Figure 3:
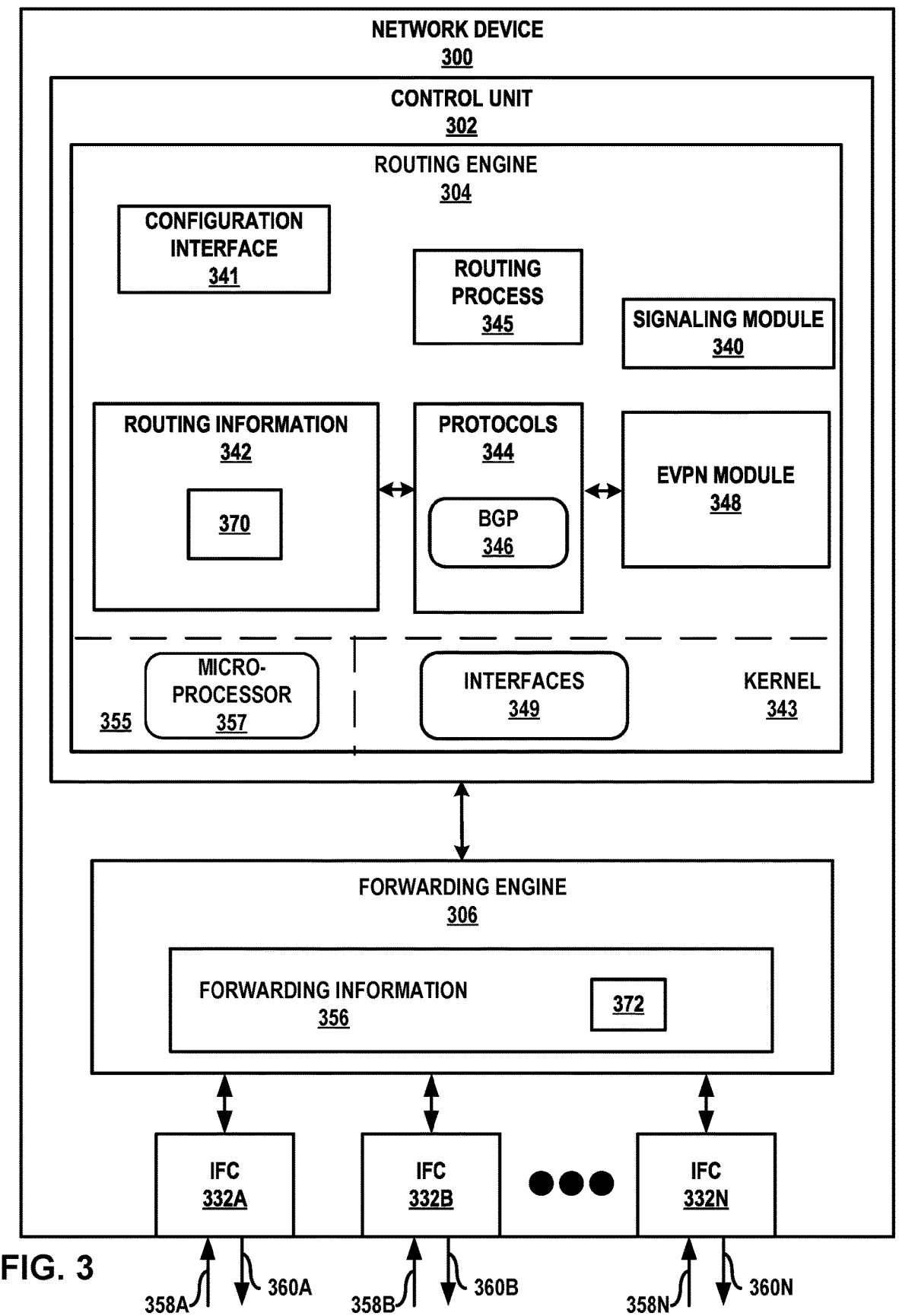
FIG. 3 is a block diagram illustrating an example of a network device that implements improved port mirroring over EVPN VXLAN, in accordance with techniques described in this disclosure.

FIG. 3 is a block diagram illustrating an example of a network device 300 configured to provide improved port mirroring over EVPN VXLAN, in accordance with techniques described in this disclosure. Network device 300 may represent an example instance of any of leaf devices 108 and spine devices 104 of FIGS. 1-2.

Network device 300 includes a control unit 302 that includes a routing engine 304, and control unit 302 is coupled to a forwarding engine 306. Forwarding engine 306 is associated with one or more of interface cards 332A-332N ("IFCs 332") that receive packets via inbound links 358A-358N ("inbound links 358") and send packets via outbound links 360A-360N ("outbound links 360"). IFCs 332 are typically coupled to links 358, 360 via a number of interface ports (not shown). Interfaces for inbound links 358 and outbound links 360 may represent physical interfaces, logical interfaces, or some combination thereof. Interfaces for links 358, 360 may represent local interfaces of network device 300 for Ethernet links for one or more Ethernet segments of a network.

Elements of control unit 302 and forwarding engine 306 may be implemented solely in software, or hardware, or may be implemented as combinations of software, hardware, or firmware. For example, control unit 302 may include one or more processors, one or more microprocessors, digital signal processors (DSPs), application specific integrated circuits (ASICs), field programmable gate arrays (FPGAs), or any other equivalent integrated or discrete logic circuitry, or any combination thereof, which execute software instructions. In that case, the various software modules of control unit 302 may comprise executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other computer-readable media. Computer-readable media may be encoded with instructions corresponding to various aspects of network device 300, e.g., protocols. Control unit 302, in some examples, retrieves and executes the instructions from memory for these aspects.

Routing engine 304 includes kernel 343, which provides a run-time operating environment for user-level processes. Kernel 343 may represent, for example, a UNIX operating system derivative such as Linux or Berkeley Software Distribution (BSD). Kernel 343 offers libraries and drivers by which user-level processes may interact with the underlying system. Hardware environment 355 of routing engine 304 includes microprocessor 357 that executes program instructions loaded into a main memory (not shown in FIG. 3) from a storage device (also not shown in FIG. 3) in order to execute the software stack, including both kernel 343 and processes executing on the operating environment provided by kernel 343. Microprocessor 357 may represent one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

Kernel 343 provides an operating environment for a routing process 345 that executes various protocols 344 at different layers of a network stack, including protocols for implementing Ethernet Virtual Private Networks. For example, routing engine 304 includes network protocols that operate at a network layer of the network stack. In the example of FIG. 3, network protocols include the Border Gateway Protocol (BGP) 346, which is a routing protocol. Routing engine 304 may also include other protocols, such as an MPLS label distribution protocol and/or other MPLS protocols not shown in FIG. 3. Routing engine 304 is responsible for the maintenance of routing information 342 to reflect the current topology of a network and other network entities to which network device 300 is connected. In particular, routing protocols periodically update routing information 342 to accurately reflect the topology of the network and other entities based on routing protocol messages received by network device 300.

Kernel 343 includes an interfaces table 349 ("interfaces 349") that represents a data structure that includes a corresponding entry for each logical interface configured for network device 300. Logical interfaces may correspond to local interfaces of network device 300 for Ethernet segments. Entries for respective logical interfaces may specify respective current information describing the logical interfaces.

Routing information 342 may include information defining a topology of a network, including one or more routing tables and/or link-state databases. Typically, the routing information defines routes (i.e., series of next hops) through a network to destinations/prefixes within the network learned via a distance-vector routing protocol (e.g., BGP) or defines the network topology with interconnected links learned using a link state routing protocol (e.g., IS—IS or OSPF).

Routing engine 304 also includes an EVPN module 348 that performs L2 learning using BGP 346. EVPN module 348 may maintain tables for each EVI established by network device 300, or in alternative examples, may maintain one or more tables that are independent of each respective EVI. Network device 300 may use EVPN module 348 to advertise, e.g., EVPN routes, including Inclusive Multicast Ethernet Tag (IMET) (Type 3) routes to advertise information about network device 300 that is used to send BUM traffic to network device 300. EVPN module 348 may also send other EVPN routes, such as Ethernet AD routes (Type 1) to advertise reachability of network device 300 for an Ethernet segment, Ethernet segment routes (Type 4) to discover other network devices of the Ethernet segment and for purposes of designated forwarder (DF) election (and backup DF election) for the Ethernet segment, and others. EVPN module 348 may store information from the routes, such as the identification of network devices connected to an analyzer.

Signaling module 340 outputs control plane messages to automatically establish tunnels to interconnect multiple network devices including network device 300 and otherwise provision one or more EVIs configured for network device 300 and other network devices. Signaling module 340 may signal the network devices using one or more suitable tunnel signaling protocols, such as GRE, VXLAN, and/or MPLS protocols. Signaling module 340 can communicate with forwarding engine 306 to automatically update forwarding information 356. In some examples, signaling module 340 may be part of or executed by routing process 345.

Routing engine 304 also includes a configuration interface 341 that receives and may report configuration data for network device 300. Configuration interface 341 may represent a command line interface; a graphical user interface; Simple Network Management Protocol (SNMP), Netconf, or another configuration protocol; or some combination of the above in some examples. Configuration interface 341 receives configuration data configuring the network device 300, and other constructs that at least partially define the operations of network device 300, including the techniques described herein. For example, an administrator may, after powering-up, activing or otherwise enabling network device 300 to operate within a network, interact with control unit 302 via configuration interface 341 to configure, e.g., network device 300 as a mirror root device or mirror leaf device, as described in this disclosure.

Forwarding engine 306 represents hardware and logic functions that provide high-speed forwarding of network traffic. Forwarding engine 306 typically includes a set of one or more forwarding chips programmed with forwarding information 356 that maps network destinations with specific next hops and the corresponding output interface ports. In general, when network device 300 receives a packet via one of inbound links 358, forwarding engine 306 identifies an associated next hop for the data packet by traversing the programmed forwarding information 356 based on information within the packet. Forwarding engine 306 forwards the packet on one of outbound links 360 mapped to the corresponding next hop.

In the example of FIG. 3, forwarding engine 306 includes forwarding information 356. In accordance with routing information 342, forwarding engine 305 stores forwarding information 356 that maps packet field values to network destinations with specific next hops and corresponding outbound interface ports. For example, routing engine 304 analyzes routing information 342 and generates forwarding information 356 in accordance with routing information 342. For example, routing information 342 may include EVPN routes 370, such as IMET routes including extended communities indicating network devices connected to analyzers, in accordance with the techniques described in this disclosure. Forwarding information 356 may be maintained in the form of one or more tables, link lists, radix trees, databases, flat files, or any other data structures.

Forwarding engine 306 stores forwarding information 356 for each EVPN instance (EVI) established by network device 300 to associate network destinations with specific next hops and the corresponding interface ports. Forwarding engine 306 forwards the data packet on one of outbound links 360 to the corresponding next hop in accordance with forwarding information 356. At this time, forwarding engine 306 may push and/or pop labels from the packet to forward the packet along a correct label switched path.

Routing process 345 may generate EVPN routes and send and receive, via BGP 346 sessions with other network devices, EVPN routes. Routing process 345 may store generated EVPN routes and import/store received EVPN routes to a route table storing EVPN routes 370 in routing information 342.

In accordance with the techniques described herein, in an example in which network device 300 is connected to an analyzer, network device 300 may send an extended routing message, e.g., IMET route, including information indicating network device 300 is connected to the analyzer. For example, a user or administrator may use configuration interface 341 to configure network device 300 as a mirror root device (e.g., set vlans ANALYZER vni 9000 mirror root) for an analyzer VLAN to enable network device 300 to send an extended routing message including an information that indicates network device 300 is connected to the analyzer. Routing process 345 may then use BGP 346 to generate an EVPN route, such as an IMET route, with an extended community that includes information indicating network device 300 is connected to an analyzer. Routing process 345 may send the extended routing message to other network devices in the analyzer VLAN via outbound links 360 to cause the other network devices of the analyzer VLAN to send traffic to only network device 300.

In an example in which network device 300 is not connected to an analyzer, a user or administrator may use configuration interface 341 to configure network device 300 as a mirror leaf device (e.g., set vlans ANALYZER vni 9000 mirror leaf) for an analyzer VLAN to enable network device 300 to configure a flood list next hop as the network device that advertised the extended routing message including the information indicating a network device is connected to the analyzer. In response to receiving an extended routing message, routing process 345 may store the extended routing message, e.g., IMET route with an extended community, in routing information 342, as EVPN route 370, and in accordance with the extended routing message in routing information 342, forwarding engine 305 stores a next hop 372 corresponding to an outbound interface port that is used to tunnel traffic to the network device that advertised the extended routing message. In this way, when network device 300 receives a packet that is to be analyzed by the analyzer via one of inbound links 358, forwarding engine 306 identifies an associated next hop 372 for a mirrored packet by traversing the programmed forwarding information 356, encapsulates an outer packet with a virtual network identifier ("VNI"), such as a VXLAN tag (e.g., VNI 9000 in this example), that identifies a corresponding VXLAN instance, and sends the packet to the outbound interface port that is used to tunnel traffic to the mirror root device that is connected to the analyzer.

Figure 4:
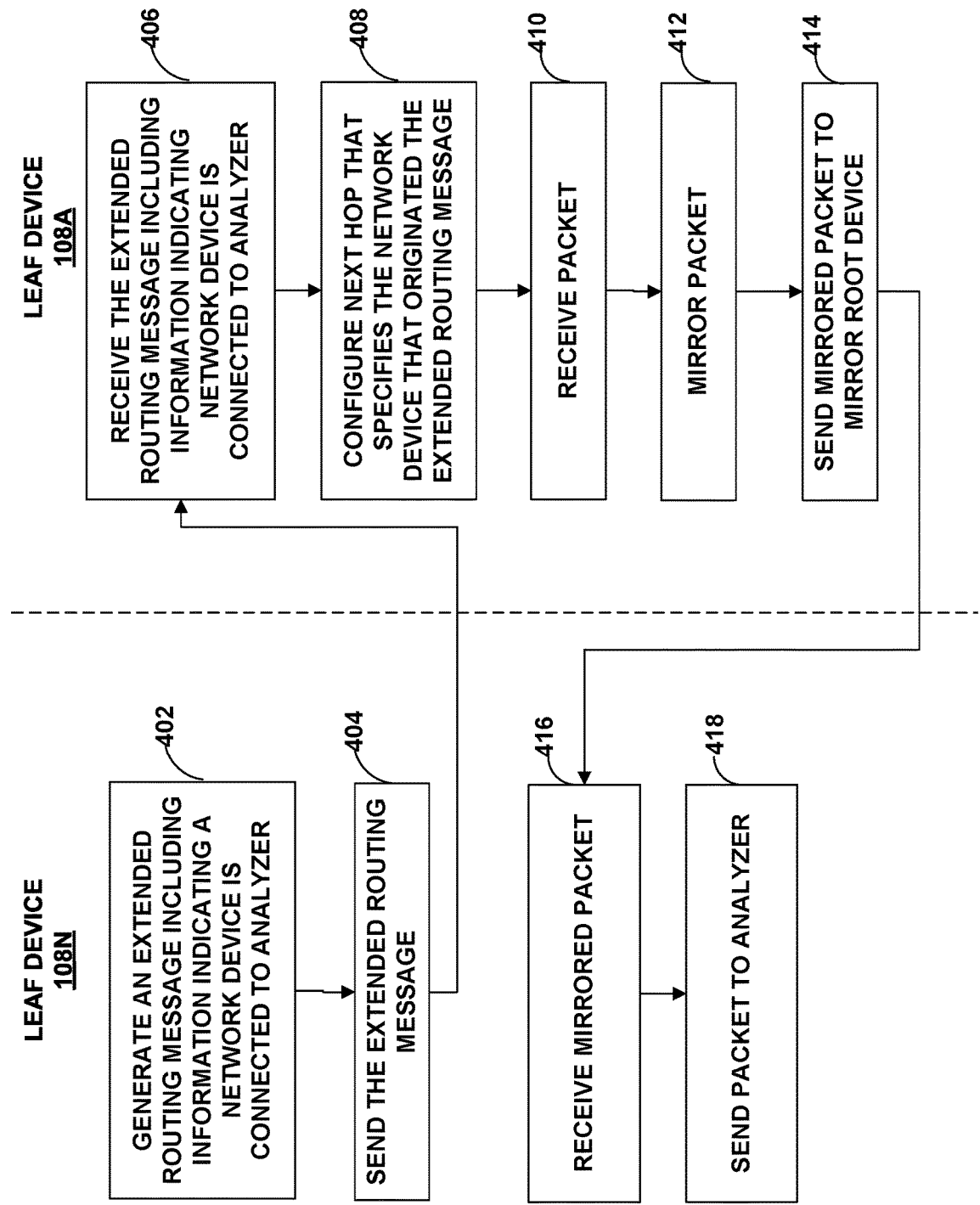
FIG. 4 is a flowchart illustrating an example method for improving port mirroring over EVPN VXLAN, in accordance with techniques described in this disclosure.

FIG. 4 is a flowchart illustrating an example method 400 for improving port mirroring in EVPN VXLAN, in accordance with the techniques described in this disclosure. The method of FIG. 4 is explained with respect to network device 300 of FIG. 3 and networks 100 of FIGS. 1 and 2. However, other network devices (e.g., switches or other routers) may perform this or a substantially similar method. Moreover, the method of FIG. 4 need not necessarily be performed in the order shown.

In the example of FIG. 4, leaf device 108N is connected to analyzer 122. In this example, leaf device 108N generates an extended routing message including information indicating leaf device 108N is connected to the analyzer (402). For example, an administrator may configure (e.g., using the CLI) leaf device 108N with a description for the analyzer VLAN (e.g., "Remote Analyzer VLAN"), a VLAN identifier (ID) (e.g., VNI 9000), and is further configured as a "mirror root" device for the analyzer VLAN to cause leaf device 108N to advertise an extended routing message, e.g., IMET route, including information that indicates leaf device 108N is connected to analyzer 122. Routing process 345 of leaf device 108N may then use BGP 346 to generate an EVPN route, such as an IMET route, with an extended community that includes information indicating leaf device 108N is connected to an analyzer.

Leaf device 108N sends the extended routing message to other devices of the analyzer VLAN (404). For example, routing process 345 may send the extended routing message to other network devices in the analyzer VLAN via one of outbound links 360 to cause the other network devices of the analyzer VLAN to send traffic to only network device 300.

In response to receiving the extended routing message (406), leaf device 108A configures a flood list next hop that specifies the device that originated the extended routing message, e.g., leaf device 108N (408). For example, leaf device 108A is configured with a description for the analyzer VLAN (e.g., "Remote Analyzer VLAN"), a VLAN identifier (ID) (e.g., VNI 9000), and are further configured as "mirror leaf" devices for the analyzer VLAN to cause the mirror leaf devices to configure a flood list next hop that specifies a device (e.g., leaf device 108N) that advertises an extended routing message, e.g., Inclusive Multicast Ethernet Tag (IMET) (Type 3) EVPN route, including information that indicates leaf device 108N is connected to analyzer 122. In response to receiving an extended routing message, routing process 345 of leaf device 108A may store the extended routing message, e.g., IMET route with an extended community, in routing information 342, as EVPN route 370, and in accordance with the extended routing message in routing information 342, forwarding engine 305 stores a next hop 372 corresponding to an outbound interface port that is used to tunnel traffic to the network device that advertised the extended routing message.

When leaf device 108A receives a packet to be analyzed by the analyzer (410), leaf device 108A mirrors the packet for the analyzer VLAN (412) and sends the mirrored packet to the mirror root device, e.g., leaf device 108N (414). For example, when leaf device 108A receives a packet that is to be analyzed by the analyzer via one of inbound links 358, forwarding engine 306 identifies an associated next hop 372 for a mirrored packet by traversing the programmed forwarding information 356, encapsulates an outer packet with a virtual network identifier ("VNI"), such as a VXLAN tag (e.g., VNI 9000 in this example), that identifies a corresponding VXLAN instance, and sends the packet to the outbound interface port that is used to tunnel traffic to the mirror root device that is connected to the analyzer.

Leaf device 108N receives the mirrored packet (416) and sends the mirrored packet to the connected analyzer (418). For example, leaf device 108N may decapsulate the outer packet that identifies a corresponding VXLAN instance, and sends the packet to the connected analyzer.

In some examples, leaf device 108A may receive a second extended routing message including information indicating a second device (e.g., spine device 104A in FIG. 2) is connected to a second analyzer. In these examples, leaf device 108A configures a next hop for each of the devices that originated an extended routing message, e.g., leaf device 108N and spine device 104A). In this way, when leaf device 108A receives a packet that is to be analyzed by the analyzer via one of inbound links 358, forwarding engine 306 identifies an associated next hop 372 for a mirrored packet by traversing the programmed forwarding information 356, encapsulates an outer packet to a respective mirrored packet with a virtual network identifier ("VNI"), such as a VXLAN tag (e.g., VNI 9000 for both mirror root devices), that identifies a corresponding VXLAN instance, and sends the respective mirrored packets to the corresponding outbound interface port that is used to tunnel traffic to the mirror root devices that are connected to the analyzers.

Figure 5:
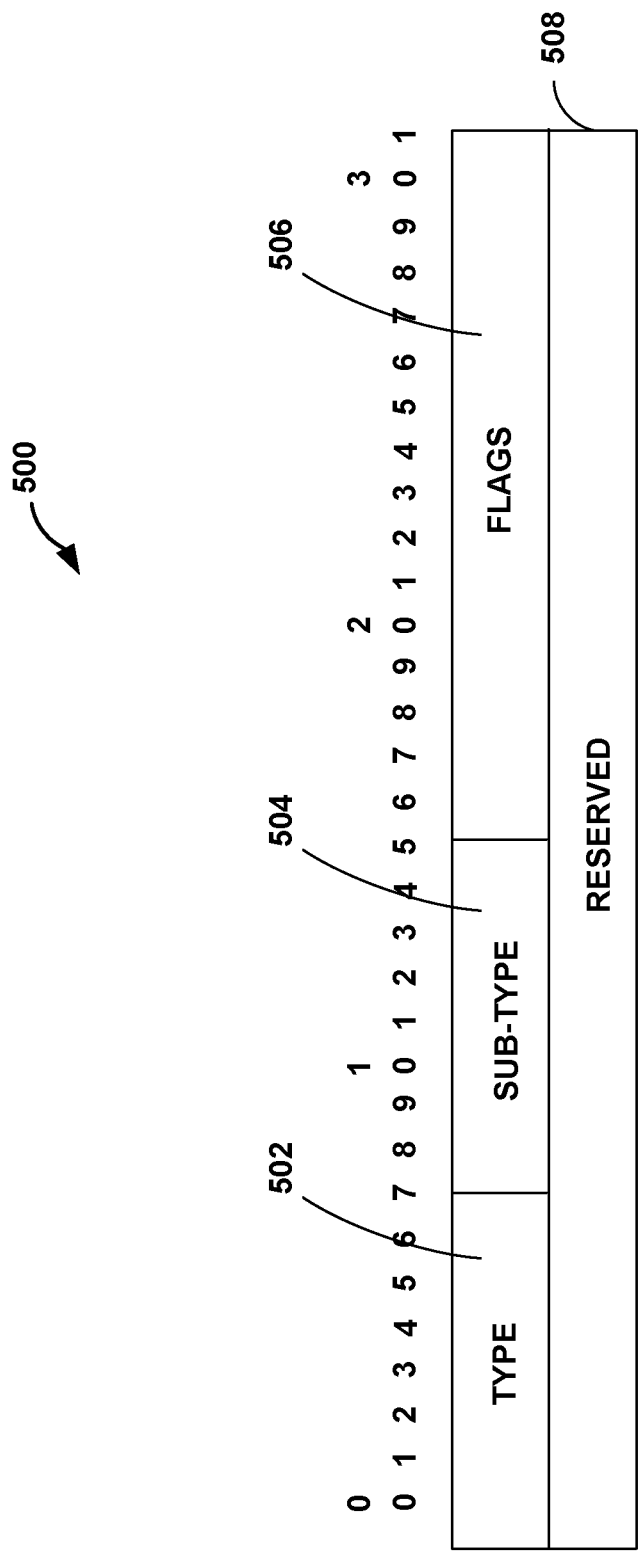
FIG. 5 is a block diagram illustrating an example packet format of an extended routing message, in accordance with the techniques described in this disclosure.

FIG. 5 is a block diagram illustrating an example packet format of an extended routing message, in accordance with the techniques described in this disclosure. For example, packet 500 may represent an extended community for extended routing messages 124 and/or 128 of FIGS. 1 and 2, such as an IMET route. In the example of FIG. 5, packet 500 includes a type field 502 and sub-type field 504 that specifies, for example, that packet 500 is an extended community for an IMET route. Packet 500 may also include a reserved field 508 to specify any additional or other information to packet 500.

In accordance with the techniques described herein, packet 500 includes flags 506 that specify whether a device advertising packet 500 is configured as a mirror root device or a mirror leaf device. For example, a device that is configured as a mirror root device may set a value of "1" for a lower order bit of flags 506 to indicate to other devices that the device advertising packet 500 is configured as a mirror root device. Alternatively, a device that is configured as a mirror leaf device may set a value (e.g., default value) of "0" for a lower order bit of flags 506 to indicate to other devices that the device advertising packet 500 is configured as a mirror leaf device.

FIG. 5 is merely an example and any values may be set to indicate whether a device is configured as a mirror root device or mirror leaf device. For example, a device may set a value of "0" of flags 506 to indicate the device is configured as a mirror root device and/or set a value of "1" of flags 506 to indicate the device is configured as a mirror leaf device.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

What is claimed is:

1. A method comprising:
receiving, by a first network device of a plurality of network devices of a leaf and spine network configured with an Ethernet Virtual Private Network and from a second network device of the plurality of network devices, an extended routing message including information indicating the second network device is connected to an analyzer that is configured to analyze packets, and wherein the plurality of network devices is configured with a Virtual Local Area Network (VLAN) for which the analyzer is configured to analyze packets; and configuring, within forwarding information of the first network device and in response to receiving the extended routing message advertised by the second network device, a next hop that specifies packets received by the first network device and associated with the VLAN are to be forwarded by the first network device directly to the second network device without flooding the packets to each of the plurality of network devices configured with the VLAN.

2. The method of claim 1,
wherein the extended routing message comprises an Inclusive Multicast Ethernet Tag (IMET) route including an extended community that specifies the information indicating the second network device is connected to the analyzer.

3. The method of claim 1,
wherein the first network device is configured as a mirror leaf device for the VLAN to enable the first network device to configure, in response to receiving the extended routing message, the next hop to the second network device that advertised the extended routing message, and
wherein the second network device that is connected to the analyzer is configured as a mirror root device for the VLAN to enable the second network device to send the extended routing message to the plurality of network devices.

4. The method of claim 1, further comprising:
receiving, by the first network device, a packet to be sent to the analyzer;
copying, by the first network device and in response to a lookup of the forwarding information, the packet to generate a mirrored packet for a port to the second network device; and
sending, by the first network device, the mirrored packet via the port to the second network device without flooding the packet to all ports to the plurality of network devices.

5. The method of claim 4,
wherein the next hop comprises a virtual tunnel endpoint (VTEP) address to the second network device, and
wherein sending the mirrored packet to the second network device comprises sending the packet encapsulated with the VTEP address to the second network device.

6. The method of claim 1, wherein the extended routing message comprises a first extended routing message, wherein the analyzer comprises a first analyzer, wherein the next hop comprises a first next hop, the method further comprising:
receiving, by the first network device, a second extended routing message including routing information including information indicating a third network device is connected to a second analyzer; and
configuring, within the forwarding information of the first network device and in response to receiving the second extended routing message from the third network device, a second next hop that specifies packets associated with the VLAN are to be forwarded to the third network device.

7. The method of claim 6, further comprising:
receiving, by the first network device, a packet to be sent to the analyzer;
copying, by the first network device and in response to a lookup of the forwarding information, the packet to generate a mirrored packet for a first port to the second network device and for a second port to the third network device; and
sending, by the first network device, the mirrored packet via the first port to the second network device and via the second port to the third network device without flooding the traffic to all ports to the plurality of network devices.

8. The method of claim 7,
wherein the first next hop comprises a first virtual tunnel endpoint (VTEP) address associated with the second network device,
wherein the second next hop comprises a second VTEP address associated with the third network device,
wherein sending the mirrored packet to the second network device comprises sending the packet encapsulated with the first VTEP address to the second network device, and
wherein sending the mirrored packet to the third network device comprises sending the packet encapsulated with the second VTEP address to the third network device.

9. A method comprising:
generating, by a first network device of a plurality of network devices of a leaf and spine network configured with an Ethernet Virtual Private Network, an extended routing message including information indicating the first network device is connected to an analyzer configured to analyze packets, wherein the plurality of network devices is configured with a Virtual Local Area Network (VLAN) for which the analyzer is configured to analyze packets; and
sending, by the first network device, the extended routing message to the plurality of network devices configured with the VLAN to cause the plurality of network devices to configure a next hop that specifies packets received by the first network device and associated with the VLAN are to be forwarded by the first network device directly to the first network device without flooding the packets to each of the plurality of network devices configured with the VLAN.

10. The method of claim 9,
wherein the extended routing message comprises an Inclusive Multicast Ethernet Tag (IMET) route including an extended community that specifies the information indicating the first network device is connected to the analyzer.

11. The method of claim 9,
wherein the first network device is configured as a mirror root device for the VLAN to enable the first network device to send the extended routing message including information indicating the first network device is connected to the analyzer, and
wherein the second network device is configured as a mirror leaf device for the VLAN to enable the second network device to configure, in response to receiving the extended routing message from the first network device, the next hop to the first network device.

12. A first network device comprising:
a plurality of ports, wherein each port is configured to be communicatively coupled to a respective network device of a plurality of network devices of a leaf and spine network configured with an Ethernet Virtual Private Network; and
one or more processors operably coupled to a memory, wherein the one or more processors are configured to:
receive, from a second network device of the plurality of network devices, an extended routing message including information indicating the second network device is connected to an analyzer configured to analyze packets, and wherein the plurality of network devices is configured with a Virtual Local Area Network (VLAN) for which the analyzer is to analyze packets; and
configure, within forwarding information of the first network device and in response to receiving the extended routing message from the second network device, a next hop that specifies packets received by the first network device and associated with the VLAN are to be forwarded by the first network device directly to the second network device without flooding the packets to each of the plurality of network devices configured with the VLAN.

13. The first network device of claim 12,
wherein the extended routing message comprises an Inclusive Multicast Ethernet Tag (IMET) route including an extended community that specifies the information indicating the second network device is connected to the analyzer.

14. The first network device of claim 12,
wherein the first network device is configured as a mirror leaf device for the VLAN to enable the first network device to configure, in response to receiving the extended routing message from the second network device, the next hop to the second network device that advertised the extended routing message, and
wherein the second network device is configured as a mirror root device for the VLAN to enable the second network device to send the extended routing message to the plurality of network devices.

15. The first network device of claim 12, wherein the one or more processors are further configured to:
receive a packet to be sent to the analyzer;
copy, in response to a lookup of the forwarding information, the packet to generate a mirrored packet for a port to the second network device; and
send the mirrored packet via the port to the second network device without flooding the packet to all ports to the plurality of network devices.

16. The first network device of claim 15,
wherein the next hop comprises a virtual tunnel endpoint (VTEP) address to the second network device, and
wherein, to send the mirrored packet to the second network device, the one or more processors are further configured to send the packet including the VTEP address to the second network device.

17. The first network device of claim 12, wherein the extended routing message comprises a first extended routing message, wherein the analyzer comprises a first analyzer, wherein the next hop comprises a first next hop, wherein the one or more processors are further configured to:
receive a second extended routing message including routing information including information indicating a third network device is connected to a second analyzer; and
configure, within the forwarding information of the first network device and in response to receiving the second extended routing message from the third network device, a second next hop for the VLAN that specifies packets associated with the VLAN are to be forwarded to the third network device.

18. The first network device of claim 17, wherein the one or more processors are further configured to:
receive a packet to be sent to the analyzer;
copy, in response to a lookup of the forwarding information, the packet to generate a mirrored packet for a first port to the second network device and for a second port to the third network device; and
send the mirrored packet via the first port to the second network device and via the second port to the third network device without flooding the traffic to all ports to the plurality of network devices.

19. The first network device of claim 18,
wherein the first next hop comprises a first virtual tunnel endpoint (VTEP) address to the second network device,
wherein the second next hop comprises a second VTEP address to the third network device,
wherein, to send the mirrored packet to the second network device, the one or more processors are further configured to send the packet encapsulated with the first VTEP address to the second network device, and
wherein, to send the mirrored packet to the third network device, the one or more processors are further configured to send the packet encapsulated with the second VTEP address to the third network device.

20. The method of claim 1, wherein the analyzer is configured to monitor network traffic, enforce policies, and identify problems in the leaf and spine network.

* * * * *